United States Patent
Sarkar et al.

(10) Patent No.: US 12,539,270 B2
(45) Date of Patent: Feb. 3, 2026

(54) CLEANSING, MOISTURIZING AND NON-IRRITATING TOPICAL COMPOSITIONS

(71) Applicant: OCuSOFT, Inc., Rosenberg, TX (US)

(72) Inventors: Paramita Sarkar, Rosenberg, TX (US); Brandon Sands, Rosenberg, TX (US); Troy Smith, Rosenberg, TX (US)

(73) Assignee: OCUSOFT, INC., Rosenberg, TX (US)

( * ) Notice: Subject to any disclaimer, the term of this patent is extended or adjusted under 35 U.S.C. 154(b) by 489 days.

(21) Appl. No.: 18/066,043

(22) Filed: Dec. 14, 2022

(65) Prior Publication Data

US 2023/0190632 A1    Jun. 22, 2023

Related U.S. Application Data

(60) Provisional application No. 63/291,116, filed on Dec. 17, 2021.

(51) Int. Cl.
| | | |
|---|---|---|
| *A61K 36/00* | (2006.01) | |
| *A61K 8/41* | (2006.01) | |
| *A61K 8/44* | (2006.01) | |
| *A61K 8/60* | (2006.01) | |
| *A61K 8/73* | (2006.01) | |
| *A61K 8/9789* | (2017.01) | |
| *A61K 8/99* | (2017.01) | |
| *A61Q 19/00* | (2006.01) | |
| *A61Q 19/10* | (2006.01) | |

(52) U.S. Cl.
CPC ............ *A61K 8/9789* (2017.08); *A61K 8/416* (2013.01); *A61K 8/442* (2013.01); *A61K 8/602* (2013.01); *A61K 8/735* (2013.01); *A61K 8/99* (2013.01); *A61Q 19/007* (2013.01); *A61Q 19/10* (2013.01); *A61K 2800/522* (2013.01); *A61K 2800/75* (2013.01)

(58) Field of Classification Search
CPC .................................................... A61Q 19/10
See application file for complete search history.

(56) References Cited

U.S. PATENT DOCUMENTS

| | | |
|---|---|---|
| 2014/0315995 A1 | 10/2014 | Dreher |
| 2019/0099369 A1 | 4/2019 | Buge et al. |
| 2019/0274977 A1 | 9/2019 | Adkins, Jr. et al. |
| 2020/0163909 A1 | 5/2020 | Adkins, Jr. |

FOREIGN PATENT DOCUMENTS

| | | | | |
|---|---|---|---|---|
| CA | 2790444 A | | 8/2011 | |
| CN | 103655413 A | * | 3/2014 | |
| CN | 104306249 A | | 1/2015 | |
| CN | 106398901 A | * | 2/2017 | ............... C11D 1/94 |
| CN | 111388365 A | | 7/2020 | |
| DE | 10307469 A1 | * | 9/2004 | ............ A61K 8/375 |
| WO | WO-9838868 A1 | * | 9/1998 | ............ A47K 10/16 |
| WO | 2011103449 A2 | | 8/2011 | |
| WO | 2020182318 A1 | | 9/2020 | |

OTHER PUBLICATIONS

Database GNPD [Online] Mintel: Anonymous: "Invigorating Cleanser," XP093179129, Database accession No. 8794003, *abstract* Jul. 12, 2021.

* cited by examiner

*Primary Examiner* — Qiuwen Mi
(74) *Attorney, Agent, or Firm* — D'Ambrosio & Menon, PLLC; Usha Menon

(57) ABSTRACT

A non-irritating topical composition for moisturizing and cleansing the skin includes: a mixture of moisturizers and conditioning agents; a mixture of surfactants; a mixture of anti-irritant agents; and a mixture of hydrating and rejuvenation agents, in an aqueous vehicle. At least one ingredient in each of the ingredient groups consisting of moisturizers and conditioning agents, surfactants, anti-irritant agents, and hydrating and rejuvenation agents is plant-derived. The composition is essentially free from any synthetic additives or by-products. The composition has a pH in the range of 5.0-8.0.

28 Claims, No Drawings

CLEANSING, MOISTURIZING AND NON-IRRITATING TOPICAL COMPOSITIONS

CROSS-REFERENCE TO RELATED APPLICATIONS

This application claims the benefit of Provisional U.S. Patent Application No. 63/291,116, filed Dec. 17, 2021, entitled "Cleansing and Moisturizing Topical Skin Compositions with Naturally Derived Ingredients", the entire content and disclosure of which, both express and implied, is incorporated herein by reference.

FIELD OF THE INVENTION

The invention relates generally to cleansing, moisturizing and non-irritating topical compositions for application to the skin, including the skin around the ocular region.

BACKGROUND

The human skin is constantly exposed to adverse climatic and environmental skin irritants such as dry hot winds, salt spray, winter cold and the like. Ageing, malnutrition, air pollution, chemicals, heating and air conditioning systems, detergents and household cleaning products dry the skin and damage tissue in a variety of ways. Moreover, the skin on the face and in the ocular area is much more delicate relative to the skin on other parts of the body. These sensitive areas are less able to retain moisture and are subsequently more susceptible to dryness and irritation. Fat loss due to aging and physiological responses to bacteria and allergens further increase skin fragility on the face and in the ocular area.

A range of liquids, creams, lotions and gels have been proposed for topical application to the human skin. However, these topical formulations include harsh chemicals that can impair and/or irritate the dermal layers. Synthetic surfactants are known to disrupt the natural lipid barrier of the skin leading to increased dryness. Similarly, synthetic emollients can clog skin pores and exacerbate contact allergies and irritation. These unnatural chemicals also enable toxins to be more easily absorbed through the skin causing a buildup within the body. Therefore, there is a need for a topical formulation that includes primarily naturally derived, medically active skin protectants which can act as light weight, nonocclusive mechanical barriers against environmental irritants while also cleansing and moisturizing the skin.

SUMMARY

The invention relates to topical compositions that provide convenience and comfort to users who suffer from skin and/or eye discomfort and irritation due to sensitivity to harsh chemicals.

According to an embodiment, a non-irritating topical composition for moisturizing and cleansing the skin, includes: a mixture of moisturizers and conditioning agents; a mixture of surfactants or cleansing agents; a mixture of anti-irritant agents; and a mixture of hydrating and rejuvenation agents, in an aqueous vehicle. At least one ingredient in each of the ingredient groups consisting of moisturizers and conditioning agents, surfactants, anti-irritant agents, and hydrating and rejuvenation agents is plant-derived.

The mixture of moisturizers and conditioning agents is selected from the group consisting of vegetable glycerin, hyaluronic acid and its salts, tremella fuciformis polysaccharide, watermelon extract, calendula extract and glycyrrhiza glabra extract. In a specific embodiment, the mixture of moisturizers and conditioning agents consists essentially of vegetable glycerin and a sodium salt of hyaluronic acid. The mixture of moisturizers and conditioning agents is present in a total amount of 0.005-10% w/w.

The mixture of surfactants is selected from the group consisting of at least one non-ionic surfactant and a mixture of amphoteric surfactants. In one specific embodiment, the non-ionic surfactant is decyl glucoside and the mixture of amphoteric surfactants consists essentially of cocamidopropyl betaine and an amine oxide surfactant. The amine oxide surfactant can be lauramine oxide. The mixture of surfactants is present in a total amount of 0.01-20% w/w.

The mixture of anti-irritant agents is selected from the group consisting of green tea extract and arnica. The mixture of anti-irritants is present in a total amount of 0.05-10% w/w.

The mixture of hydrating and rejuvenation agents is selected from the group consisting of jojoba extract, cucumber extract, and ocimum sanctum (or Tulsi) extract. In one specific embodiment, the mixture of hydrating and rejuvenation agents consists essentially of jojoba extract and cucumber extract. The mixture of hydrating and rejuvenation agents is present in a total amount of 0.05-10% w/w.

In one specific embodiment, a non-irritating topical composition for moisturizing and cleansing the skin, includes: 0.5-5.0% w/w decyl glucoside; 0.1-10.0% w/w vegetable glycerin; about 0.05-5.0% w/w cocamidopropyl betaine; 0.05-5.0% w/w jojoba extract; 0.05-5.0% w/w arnica extract; 0.05-5.0% w/w cucumber extract; 0.05-5.0% w/w green tea extract; 0.005-2.0% w/w sodium salt of hyaluronic acid; 0.001-3.0% w/w lauramine oxide; and an aqueous vehicle (q.s. to 100).

The pH of the composition is in the range of 5.0 to 8.0. The composition is provided in a liquid or semisolid dosage form. The composition is configured for application to intact skin using a foam, spray mist, lotion, gel, or via a pre-moistened wipe. In one embodiment, the composition is configured as a wipe-off, no rinse formulation.

DETAILED DESCRIPTION

The term and phrases "invention," "present invention," "instant invention," and similar terms and phrases as used herein are non-limiting and are not intended to limit the present subject matter to any single embodiment, but rather encompass all possible embodiments as described.

As used herein, all weight percentages (wt. %) are based on the total wt. % of the skin care composition, unless otherwise specified. Additionally, all composition percentages are based on totals equal to 100 wt. %, unless otherwise specified.

The compositions and methods for their use can "comprise," "consist essentially of," or "consist of" any of the ingredients or steps disclosed throughout the specification. As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and can include the ingredients of the present invention and do not exclude other ingredients or elements described herein. The use of the word "a" or "an" when used in conjunction with the term "comprising" in the claims and/or the specification may mean "one," but it is also consistent with the meaning of "one or more," "at least one," and "one or more than one." As used herein, "consisting essentially of" means that the invention may include ingredients in addition to those recited in the claims, but only if the additional ingredients do not materially alter the basic and novel characteristics of the claimed invention. Generally, such additives may not be present at all or only in trace amounts. However, it may be possible to include up to about 10% by weight of materials that could materially alter the basic and novel characteristics of the invention as long as the utility of the composition (as opposed to the degree of utility) is maintained.

All ranges recited herein include the endpoints, including those that recite a range "between" two values. Terms such as "about," "generally," "substantially," and the like are to be construed as modifying a term or value such that it is not an absolute. Such terms will be defined by the circumstances and the terms that they modify as those terms are understood by those of skill in the art. In one non-limiting embodiment, the terms are defined to be within 5%. The term "substantially" and its variations are defined as being largely but not necessarily wholly what is specified as understood by one of ordinary skill in the art, and in one non-limiting embodiment substantially refers to ranges within 0.01% to 5%.

As used herein, the term "effective amount" of a composition refers to an amount sufficient to elicit the desired biological response. As will be appreciated by those of ordinary skill in this art, and effective amount of a substance may vary depending on such factors as the desired biological endpoint, the patient, etc. The terms effective amount and clinically effect may be used interchangeably herein. For example, an effective amount/clinically effective amount of the composition is the amount that can be used facilitate cleansing and moisturization of the skin.

In one embodiment of the invention, a topical composition (hereinafter also referred to as "composition" or "formulation") can include a mixture of cleansing agents/surfactants, a mixture of moisturizers or conditioning agents, a mixture of anti-irritant agents, and a mixture of hydrating and rejuvenation agents, in an aqueous vehicle. The moisturizers and cleansing agents can be derived from natural products and can be essentially free from any synthetic additives or by-products. In one or more embodiments, the composition can further include an emollient/oil, a mild astringent, a mixture of sensory agents, a protectant, and an oil/micellar vehicle.

Various ingredients can be employed to act as the cleansing agents/surfactants, emollients, sensory agents, etc. in place of harsh synthetic chemicals. Thus, the present invention describes cleansing and moisturizing topical skin care compositions wherein primarily naturally derived ingredients are substantially utilized.

The composition is non-irritating, intended for application to the skin, and is mild enough to be used on the eyelids around the eye area (that is, the "ocular region"). The composition can be provided in a liquid or semisolid dosage form that may be applied to intact skin, on the face or around the eyes using a foam, spray mist, lotion or gel or via a pre-moistened wipe/towelette. When packaged in the form of pre-moistened wipes, the towelette material, the packaging material, and any retail tertiary packaging may be made from at least one of a natural and/or a sustainably sourced, eco-friendly material. The pH of the composition is in the range of 4-9. Preferably, the pH is in the range of 5.0-8.0. The composition may be adjusted to an osmolality of 50-400 mOsm/Kg. The composition can be clear to slightly yellow in color.

The composition can include at least two or more cleansing agents or surfactants (used interchangeably herein). The cleansing agent can be present in a total amount of 0.001-15% w/w. The cleansing agent can include, without limitation, glucosides, cocamidopropyl betaine, sucrose cocoate, yucca extract, phospholipids, phospholipid derivatives, polyoxyethylene derivatives of sorbitan esters (for instance, polysorbate 20, polysorbate 60, polysorbate 80 etc.), polyoxyethylene derivatives of long chain alcohol ethers (for instance, polyethylene glycol hexadecyl ether or Cetomacrogol 1000), lauramphoacetates, sodium lauryl ether, long chain esters of succinic acid (for instance, Dioctyl sodium sulfosuccinate), and combinations thereof. The cleansing agent may also be selected from a group comprising an ester and/or a mixture of esters of a sugar or sugar derivatives, or fatty acid esters of glycerol and their derivatives, and combinations thereof.

In one exemplary embodiment, the surfactants can be selected from a group consisting of at least one non-ionic surfactant and at least two amphoteric surfactants. The non-ionic surfactant can include decyl glucoside and polysorbate 20. The amphoteric surfactants can include cocamidopropyl betaine and an amine oxide surfactant, such as, lauramine oxide.

The moisturizers or conditioning agents can include, without limitation, vegetable glycerin, hyaluronic acid and its salts (such as, sodium salts) and derivatives, tremella fuciformis polysaccharide, alginic acid and its derivatives, watermelon extract, calendula extract, glycyrrhiza glabra extract and combinations thereof. The moisturizing or conditioning agents can be present at a total concentration of 0.005-10% w/w. The moisturizing agent can be a polymeric moisturizing agent comprising at least one sugar moiety and having a molecular weight greater than 5 kDa. Preferably, the average molecular weight of the polymeric moisturizing agent is greater than 100 kDa, and ideally 1 MDa.

The anti-irritant agents can be selected from the group consisting of arnica extract and green tea extract. The anti-irritant agents can be present at a total concentration of 0.05-10% w/w.

The hydrating and rejuvenating (or toning/refreshing) agents can include, without limitation, jojoba extract, cucumber extract, ocimum sanctum (or Tulsi) extract, guava extracts, eucalyptus extract, peppermint, spearmint, licorice extract, camphor, camphor derivatives, and combinations thereof. The hydrating and rejuvenating agents can be present at a total concentration of 0.05-10% w/w.

The composition may also contain 0.01-5% w/w of lubricating and emollient agents such as eyebright in sunflower oil, glycerin, propylene glycol, medium chain triglycerides, coconut oil, olive squalane, sunflower oil, castor oil and other vegetable oils and their derivatives and combinations. The composition can also include 0.01-5% w/w of a mild astringent, such as, lotus and comfrey extracts, and 0.01-2% w/w of sensory agents, such as camphor and ginger-mint extracts.

A sufficient amount of purified or USP sterile water can be added so as to achieve a desired weight (q.s. to 100).

In one or more embodiments, the present composition is a vehicle for delivering cleansing agents, combined with natural moisturizing agents and anti-irritants in a wipe-off, no rinse formula that is mild, soothing and replenishing. Advantageously, the composition does not include any harsh chemicals while delivering a lasting moisturizing action. The composition can be used by any person with skin discomfort due to dryness, specifically on the face, eyelids and around the eye area, and who are sensitive to certain chemicals. It may also be used in hospitals, doctors' offices, or by patients and home healthcare providers. In one embodiment, the present composition can also have veterinary and surgical scrub use.

At least one ingredient in each of the ingredient groups consisting of moisturizers and conditioning agents, surfactants, anti-irritant agents, and hydrating and rejuvenation agents is plant-derived.

In an exemplary embodiment, the composition includes 0.5-5.0% w/w decyl glucoside, 0.1-10.0% w/w vegetable glycerin, 0.05-5.0% w/w cocamidopropyl betaine, 0.05-5.0% w/w jojoba extract, 0.05-5.0% w/w arnica extract, 0.05-5.0% w/w cucumber extract, 0.05-5.0% w/w green tea extract, 0.005-2.0% w/w hyaluronic acid, 0.001-3.0% w/w lauramine oxide, and water.

Other exemplary embodiments of the composition are illustrated in the following table:

| Component | Purpose | % w/w | % w/w | % w/w | % w/w |
|---|---|---|---|---|---|
| Hyaluronic Acid | Moisturizer | 0.01% | 0.01% | | 0.02% |
| *Tremella fuciformus* polysaccharide | Moisturizer | | | 0.10% | 0.20% |
| Polysorbate 20 | Nonionic Surfactant | | | 4.00% | |
| Cocamidopropyl betaine | Amphoteric Surfactant | 0.15% | 0.50% | 0.25% | 1.00% |
| Lauramine oxide | Surfactant/Preservative | 0.10% | 0.30% | 0.15% | 0.10% |
| Decyl Glucoside | Nonionic Surfactant | 1.00% | 1.00% | 1.00% | 2.00% |
| Vegetable Glycerin | Emollient/Oil | 2.00% | | | |
| Olive Squalane | Emollient/Oil | | | 0.20% | |
| Eyebright extract in sunflower oil | Anti-inflammation | | | 0.005% | |
| Camphor | Sensory/cooling | | 0.05% | 0.01% | |
| Jojoba Extract | Hydration/Anti-aging | 0.10% | 0.50% | 0.05% | 0.50% |
| *Arnica* Extract | Anti-Inflammation/Irritancy | 0.10% | 0.50% | 0.05% | 0.50% |
| Green Tea Extract | Antioxidant | 0.20% | 2.00% | 1.00% | 2.00% |
| Ginger-Mint Extract | Sensory | | 0.50% | 0.50% | 0.50% |
| Cucumber Extract | Complexion/Rejuvenation | 0.10% | 0.50% | 0.50% | |
| *Lotus* Extract | Protectant/Astringent | | 0.10% | 0.10% | |
| Watermelon Extract | Conditioning/Moisturizing | | 0.10% | 0.10% | |
| Comfrey Extract | Mild Astringent | | | | 0.10% |
| *Calendula* Extract | Conditioning/Moisturizing | | | | 0.10% |
| *Glycyrrhiza Glabra* extract | Conditioning/Moisturizing | | | | 0.50% |
| *Ocimum Sanctum* (or Tulsi) extract | Soothing/Rejuvenating | | | | 0.50% |
| Water | Vehicle | Q.s. to 100 | Q.s. to 100 | Q.s. to 100 | Q.s. to 100 |

Method of Preparation

An exemplary method of preparing the composition is described below.

The method involves using an overhead mixer at 500-1000 RPM to disperse sodium hyaluronate in 40%-50% of the total vehicle phase, until a homogeneous solution or dispersion formed. The mixer speed is reduced to 500 RPM and decyl glucoside and cocamidopropyl betaine is dissolved into the mixture. Then, a desired amount of green tea extract, arnica extract, jojoba extract and cucumber extract are added to the mixture, one by one, until completely dissolved. Lauramine oxide (usually available as a 30% aqueous solution) is added to this mixture. USP water is added to reach a q.s. of 100 and the mixing is continued for an additional 30 minutes. The mixture is then filtered through a filter with a pore size that is 5 microns or less.

Chemical Safety Testing

Ocular irritation is defined as reversible damage to the eye following the application of a test substance. The MatTek™ Protocol: "EpiOcular™ Irritation Test" was used to study whether the subject composition was classified as an irritant. This test method uses a three-dimensional engineered human tissue-like structure. Basically, 50 μl of the composition is applied to the surface of the tissue in an even layer. The composition is then removed, and the tissue is allowed to recover under normal tissue culture conditions. The medium is then exchanged with a tissue culture medium containing the yellow tetrazolium dye MTT 3-(4,5-dimethylthiazol-yl)-2,3-diphenyltetrazolium bromide, which is reduced to its insoluble purple formazan compound. This dark purple compound accumulates in live cells but not in dead cells. After the cells were washed, the reduced purple compound is solubilized in isopropanol and quantified by reading the optical density at 570 nm ($OD_{570}$) using a plate reader. If the result was greater than 60% of the $OD_{570}$ of the control, the composition would be considered non-classified; if the $OD_{570}$ is less than or equal to 60% of the $OD_{570}$ of the control, the composition would be classified as an irritant. A couple of samples of the subject composition were tested using this method giving an average $OD_{570}$ that was equal to 93.9% and 68.1% of the control, for an average value of 81%, and was thus classified as an ocular non-irritant.

The chemical safety of the cleansing and moisturizing topical skin composition was also tested using 23 test samples to determine the skin irritation and sensitization (contact allergy) potential of the composition after repeated application to the skin of human subjects. Seventy-three subjects enrolled in the study and sixty-three of the subjects completed the study. Approximately 0.02-0.05 ml of the composition test material was dispensed on a 7.5 mm paper disc. Patches containing the material were affixed directly to the skin or the intrascapular region of the back. Patches remained in place for 48 hours after the first application. Thereafter a series of 8-9 consecutive 24 hour exposures were made 3 times/week for 3 consecutive weeks. Each of the test sites, before and after the application of the sample, was evaluated by trained laboratory personnel. On a scale of 0 (no reaction) to 4 (erythema, induration and bullae), none of the 63 subjects that completed the study had any reaction of any kind during the course of the study.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A non-irritating topical composition for moisturizing and cleansing the skin, comprising:
 a mixture of moisturizers and conditioning agents, wherein the mixture of moisturizers and conditioning agents consists essentially of 0.1%-10.0% w/w vegetable glycerin and 0.005%-2.0% w/w sodium salt of hyaluronic acid;
 a mixture of surfactants, wherein the mixture of surfactants is selected from the group consisting of at least one non-ionic surfactant and a mixture of amphoteric surfactants;
 a mixture of anti-irritant agents;
 a mixture of hydrating and rejuvenation agents; and
 an aqueous vehicle,
  wherein at least one ingredient in each of the ingredient groups consisting of moisturizers and conditioning agents, surfactants, anti-irritant agents, and hydrating and rejuvenation agents is plant-derived.

2. The composition according to claim 1, wherein the non-ionic surfactant is decyl glucoside.

3. The composition according to claim 1, wherein the mixture of amphoteric surfactants consists essentially of cocamidopropyl betaine and an amine oxide surfactant.

4. The composition according to claim 3, wherein the amine oxide surfactant is lauramine oxide.

5. The composition according to claim 1, wherein the mixture of anti-irritant agents is selected from the group consisting of green tea extract and arnica.

6. The composition according to claim 1, wherein the mixture of hydrating and rejuvenation agents is selected from the group consisting of jojoba extract, cucumber extract, and ocimum sanctum extract.

7. The composition according to claim 1, wherein the mixture of hydrating and rejuvenation agents consists essentially of jojoba extract and cucumber extract.

8. The composition according to claim 1, wherein the mixture of moisturizers and conditioning agents is present in a total amount of 0.005-10% w/w.

9. The composition according to claim 1, wherein the mixture of surfactants is present in a total amount of 0.01-20% w/w.

10. The composition according to claim 1, wherein the mixture of anti-irritants is present in a total amount of 0.05-10% w/w.

11. The composition according to claim 1, wherein the mixture of hydrating and rejuvenation agents is present in a total amount of 0.05-10% w/w.

12. The composition according to claim 1, wherein the pH of the composition is in the range of 5.0 to 8.0.

13. The composition according to claim 1, wherein the composition is provided in a liquid or semisolid dosage form.

14. The composition according to claim 1, wherein the composition is configured for application to intact skin using a foam, spray mist, lotion, gel, or via a pre-moistened wipe.

15. The topical composition according to claim 1, wherein the composition is configured as a wipe-off, no rinse formulation.

16. A non-irritating topical composition for moisturizing and cleansing the skin, comprising:
 0.5%-5.0% w/w decyl glucoside;
 0.1%-10.0% w/w vegetable glycerin;
 0.05%-5.0% w/w cocamidopropyl betaine;
 0.05%-5.0% w/w jojoba extract;
 0.05%-5.0% w/w arnica extract;
 0.05%-5.0% w/w cucumber extract;
 0.05%-5.0% w/w green tea extract;
 0.005%-2.0% w/w sodium salt of hyaluronic acid;
 0.001%-3.0% w/w lauramine oxide; and
 an aqueous vehicle.

17. The composition according to claim 16, wherein the pH of the composition is in the range of 5.0 to 8.0.

18. The composition according to claim 16, wherein the composition is configured as a wipe-off, no rinse formulation.

19. The composition according to claim 16, wherein the composition is provided in a liquid or semisolid dosage form.

20. The composition according to claim 16, wherein the composition is configured for application to intact skin using a foam, spray mist, lotion, gel, or via a pre-moistened wipe.

21. The composition according to claim 16, further comprising about 0.1%-0.2% w/w tremella fuciformis polysaccharide.

22. The composition according to claim 16, further comprising about 0.05%-0.5% w/w camphor.

23. The composition according to claim 16, further comprising about 0.005% w/w eyebright.

24. The composition according to claim 16, further comprising about 0.1% w/w watermelon extract.

25. The composition according to claim 16, further comprising about 0.1% w/w comfrey.

26. The composition according to claim 16, further comprising about 0.1% w/w calendula extract.

27. The composition according to claim 16, further comprising about 0.5% w/w Tulsi.

28. The composition according to claim 16, further comprising about 0.5% glycyrrhiza glabra extract.

* * * * *